US012755577B2

(12) United States Patent
Ma et al.

(10) Patent No.: US 12,755,577 B2
(45) Date of Patent: Oct. 6, 2026

(54) MULTI-VIEW HUMAN ACTION RECOGNITION METHOD BASED ON HYPERGRAPH LEARNING

(71) Applicant: Beijing University Of Technology, Beijing (CN)

(72) Inventors: Nan Ma, Beijing (CN); Ye Liang, Beijing (CN); Cong Guo, Beijing (CN); Cheng Wang, Beijing (CN); Genbao Xu, Beijing (CN)

(73) Assignee: Beijing University Of Technology, Beijing (CN)

( * ) Notice: Subject to any disclaimer, the term of this patent is extended or adjusted under 35 U.S.C. 154(b) by 368 days.

(21) Appl. No.: 18/388,868

(22) Filed: Nov. 13, 2023

(65) Prior Publication Data

US 2024/0177525 A1 May 30, 2024

(30) Foreign Application Priority Data

Nov. 17, 2022 (CN) ......................... 202211440742.7

(51) Int. Cl.
*G06V 40/20* (2022.01)
*G06V 10/77* (2022.01)
(Continued)

(52) U.S. Cl.
CPC .......... *G06V 40/20* (2022.01); *G06V 10/7715* (2022.01); *G06V 10/82* (2022.01); *G06V 20/46* (2022.01)

(58) Field of Classification Search
CPC .... G06V 40/20; G06V 40/23; G06V 10/7715; G06V 10/82; G06V 10/764; G06V 20/52; G06V 20/46
See application file for complete search history.

(56) References Cited

FOREIGN PATENT DOCUMENTS

CN 107480627 A * 12/2017 ............ G06F 18/24
CN 108537109 A * 9/2018 ............ G06V 40/28
(Continued)

OTHER PUBLICATIONS

Translated Version of CN110363236 (Year: 2019).*
(Continued)

*Primary Examiner* — Carol W Chan
(74) *Attorney, Agent, or Firm* — Bayramoglu Law Offices LLC

(57) ABSTRACT

A multi-view human action recognition method based on hypergraph learning, comprising acquiring video data from P views, and further comprising the following steps: pre-processing the video data; constructing spatial hypergraphs based on joint information; constructing temporal hypergraphs based on the joint information; performing feature learning of the spatial hypergraphs and the temporal hypergraphs using hypergraph neural networks; and extracting higher order information represented by the hypergraphs, and performing action recognition of human actions. The present invention constructs spatial hypergraphs using human joints in different views at the same moment to capture spatial dependency among multiple human joints; constructs temporal hypergraphs using human joints in different frames of the same view to capture temporal correlations among features of a particular joint in different views, so as to carry out learning based on features constructed by the spatial hypergraphs and the temporal hypergraphs using spatial-temporal hypergraph neural networks.

10 Claims, 8 Drawing Sheets

(51) Int. Cl.

| | |
|---|---|
| ***G06V 10/82*** | (2022.01) |
| ***G06V 20/40*** | (2022.01) |

(56) References Cited

FOREIGN PATENT DOCUMENTS

| | | | | | |
|---|---|---|---|---|---|
| CN | 110363236 A | * | 10/2019 | | G06F 18/23 |
| CN | 110765854 A | * | 2/2020 | | G06V 20/42 |
| CN | 113283400 A | * | 8/2021 | | G06F 18/24 |
| CN | 113762468 A | * | 12/2021 | | G06N 3/045 |
| CN | 116861332 A | * | 10/2023 | | G06F 18/2415 |

OTHER PUBLICATIONS

Wei, Jinfeng, Yunxin Wang, Mengli Guo, Pei Lv, Xiaoshan Yang, and Mingliang Xu. "Dynamic hypergraph convolutional networks for skeleton-based action recognition." arXiv preprint arXiv:2112.10570 (2021). (Year: 2021).*

Wang, Shengqin, Yongji Zhang, Hong Qi, Minghao Zhao, and Yu Jiang. "Dynamic spatial-temporal hypergraph convolutional network for skeleton-based action recognition." In 2023 IEEE International Conference on Multimedia and Expo (ICME), pp. 2147-2152. IEEE, 2023. (Year: 2023).*

Zhou, Yuxuan, Zhi-Qi Cheng, Chao Li, Yanwen Fang, Yifeng Geng, Xuansong Xie, and Margret Keuper. "Hypergraph transformer for skeleton-based action recognition." arXiv preprint arXiv:2211.09590 (2022). (Year: 2022).*

Mulas, Raffaella, and Dong Zhang. "Spectral theory of Laplace operators on oriented hypergraphs." Discrete mathematics 344, No. 6 (2021): 112372. (Year: 2021).*

Laplacian matrix, (Feb. 6, 2022), Wikipedia (Year: 2022).*

Translated version of CN108537109 (Year: 2018).*

Li Jie, et al., Research of Human Action Recognition based on Spatial-Temporal Hypergraph Neural Network, Hebei University of Technology for the Master Degree in Computer Science and Technology, 2021, pp. 1-55.

Yifan Feng, et al., Hypergraph Neural Networks, Proceedings of the AAAI Conference on Artificial Intelligence, 2019.

Lei Shi, et al., Two-Stream Adaptive Graph Convolutional Networks for Skeleton-Based Action Recognition, The Computer Vision Foundation, pp. 12026-12035.

Ziyu Liu, et al., Disentangling and Unifying Graph Convolutions for Skeleton-Based Action Recognition, The Computer Vision Foundation, pp. 143-152.

Yuxin Chen, et al., Channel-wise Topology Refinement Graph Convolution for Skeleton-Based Action Recognition, 2021.

Sijie Yan, et al., Spatial Temporal Graph Convolutional Networks for Skeleton-Based Action Recognition, 2018.

Lei Shi, et al., Skeleton-Based Action Recognition with Multi-Stream Adaptive Graph Convolutional Networks, 2019, pp. 1-13.

Ke Cheng, et al., Skeleton-Based Action Recognition with Shift Graph Convolutional Network, The Computer Vision Foundation, pp. 183-192.

Xiaoke Hao, et al., Hypergraph Neural Network for Skeleton-Based Action Recognition, IEEE Transactions on Image Processing, 2021, pp. 2263-2275, vol. 30.

Yiran Zhu, et al., Selective Hypergraph Convolutional Networks for Skeleton-based Action Recognition, ICMR '22, 2022, pp. 518-526.

* cited by examiner

Left view Middle view Right view

MULTI-VIEW HUMAN ACTION RECOGNITION METHOD BASED ON HYPERGRAPH LEARNING

CROSS REFERENCE TO RELATED APPLICATION

This application is based upon and claims foreign priority to Chinese Patent Application No. 202211440742.7, filed on Nov. 17, 2022, the entire content of which is incorporated herein by reference.

TECHNICAL FIELD

The present invention relates to the technical field of image processing, in particular to a multi-view human action recognition method based on hypergraph learning.

BACKGROUND

Action recognition is one of representative tasks of computer vision, accurate perception and recognition of human action are important prerequisites for intelligent interaction and human-machine collaboration, and they have been a widely concerned research area in application areas such as action analysis, intelligent driving, medical control, and etc. Research of body language interaction is of great significance. With increasing effectiveness of human joint detection, it has been used for action recognition. However, current methods still have defects such as a lack of temporal modeling and higher-order semantic description of joint features.

In order to explore temporal relationships among multiple features in a video sequence, traditional methods use recurrent neural networks to construct long-term associations, and more action features can be obtained by focusing on information nodes in each frame using global contextual storage units. There are also some methods aimed at using attention mechanisms to aggregate features in spatial-temporal image regions to remove influences of noise effectively and improve recognition accuracy. However, these methods are still unable to effectively model complex correlations in key regions, and this is a significant challenge for action recognition. Action recognition based on multi-view temporal sequences aims to use multi-view data and model temporal information to better address problems such as undetermined information caused by angle, illumination, occlusion, and etc. in complex scenes, and enhance feature information.

A master's thesis entitled "Research on human action recognition based on spatial-temporal hypergraph neural network" was disclosed on CNKI in May 2021, the thesis aims to recognize human actions from videos containing human actions, and the thesis researches methods of human action recognition based on hypergraph learning in details, and provides a method based on a hypergraph neural network to recognize human actions. First of all, the method performs hypergraph modeling of human joints, bones, and movement trends from a single view respectively to characterize association among skeletons during human movement; then the hypergraph neural network is designed to learn different hypergraphs, and fuse different features; finally, a classifier is used to classify video to realize human action recognition. A disadvantage of this method is that accuracy of action recognition is low when encountering problems such as, occlusion, illumination, high dynamics and positional angle in complex scenes.

SUMMARY

In order to solve the forgoing technical problems, the present invention provides a multi- view human action recognition method based on hypergraph learning. This method targets actions in complex scenes. In this method, constructing a spatial hypergraph is constructing multiple hypergraphs of human joints in different views at the same moment in order to capture spatial dependency among a multiple number of human joints; and constructing a temporal hypergraph is constructing multiple hypergraph of human joints in different frames of the same view in order to capture temporal correlation among the features of a specific joint in different views, then learning based on features constructed by the spatial hypergraph and the temporal hypergraph is carried out using a spatial-temporal hypergraph neural network, and multi-view human action recognition based on hypergraph learning is realized.

The present invention provides a multi-view human action recognition method based on hypergraph learning, the method comprises acquiring video data from P views, and further comprises the following steps:

step 1: pre-processing the video data;

step 2: constructing spatial hypergraphs based on joint information;

step 3: constructing temporal hypergraphs based on the joint information;

step 4: performing feature learning of the spatial hypergraphs and the temporal hypergraphs using hypergraph neural networks;

step 5: extracting higher order information represented by the hypergraphs, and performing action recognition of human actions.

Preferably, a method of pre-processing the video data comprises: segmenting the video data into N frames, extracting the joint information of each frame using Openpose, storing the joint information in a json file by saving x and y coordinates of joints, and constructing the spatial hypergraphs and the temporal hypergraphs based on the joint information.

In any of the above solutions, it is preferred that the spatial hypergraph is a hypergraph $\mathcal{G}^{spa}=(\mathcal{V}^{spa}, \varepsilon^{spa}, W^{spa})$ that is constructed according to a limb composition strategy by using the joints as vertices, dividing human body into five parts which are a trunk, a left hand, a right hand, a left leg, and a right leg, and connecting joints of the same part in different views at the same moment using a hyperedge, and that is used to achieve an aggregation of spatial information of joints, wherein $\mathcal{V}^{spa}$ represents a vertex set of the spatial hypergraph, $\varepsilon^{spa}$ represents a hyperedge set of the spatial hypergraph, and $W^{spa}$ represents weight of each hyperedge in the hyperedge set of the spatial hypergraph, which is a weight matrix.

In any of the above solutions, it is preferred that a method of constructing the spatial hypergraph comprises the following sub-steps:

step 21: initializing initial vertex features of each spatial hypergraph as a feature matrix $X_n$, each row of the matrix being coordinates of the joints of human;

step 22: generating the n-th spatial hypergraph $$\mathcal{G}_n^{spa};$$

step 23: constructing an incidence matrix based on the vertex set and the hyperedge set; ¿spa step 24: computing degrees $$d_n^{spa}\left(v_{p,n}^{(i)}\right)$$

of the vertices in the n-th spatial hypergraph and degrees $$\delta_n^{spa}\left(e_{m,n}^{spa}\right)$$

of the hyperedges in the n-th spatial hypergraph, wherein $$d_n^{spa}$$

represents a function for computing the degrees of the vertices in the n-th spatial hypergraph, $$\delta_n^{spa}$$

represents a function for computing the degrees of the hyperedges in the n-th spatial hypergraph, $$v_{p,n}^{(i)}$$

represents the i-th joint in the n-th frame of the p-th view, and $$e_{m,n}^{spa}$$

represents the m-th hyperedge in the n-th spatial hypergraph;

step 25: optimizing the network using higher order information, and generating a Laplace matrix $$\mathcal{G}_n^{spa}$$

by performing Laplace transformation of the incidence matrix $$H_n^{spa}.$$

In any of the above solutions, it is preferred that a calculation formula of the n-th spatial hypergraph $$\mathcal{G}_n^{spa}$$

is:

$$\mathcal{G}_n^{spa} = \left(\mathcal{V}_n^{spa}, \varepsilon_n^{spa}, W_n^{spa}\right)$$

wherein $$\mathcal{V}_n^{spa}$$

represents the vertex set of the n-th spatial hypergraph, $$\varepsilon_n^{spa}$$

represents the hyperedge set of the n-th spatial hypergraph, and $$W_n^{spa}$$

represents the weight of each hyperedge in the n-th spatial hypergraph, n=1,2, . . . ,N.

In any of the above solutions, it is preferred that the step 23 comprises that the incidence matrix $$H_n^{spa}$$

of the n-th spatial hypergraph represents topology of the n-th spatial hypergraph, and a corresponding element in the matrix is 1 if the vertex exists in a certain hyperedge, or 0 otherwise.

In any of the above solutions, it is preferred that the incidence matrix of each spatial hypergraph is defined as:

$$H_v^{spa}\left(v_{p,n}^{(i)}, e_{m,n}^{spa}\right) = \begin{cases} 1 & v_{p,n}^{(i)} \in e_{m,n}^{spa} \\ 0 & v_{p,n}^{(i)} \notin e_{m,n}^{spa} \end{cases}$$

wherein $$v_{p,n}^{(i)}$$

represents the i-th joint in the n-th frame of the p-th view, and $$e_{m,n}^{spa}$$

represents the m-th hyperedge in the n-th spatial hypergraph, wherein m=1, 2, . . . , M, and M is the number of hyperedges in a spatial hypergraph.

In any of the above solutions, it is preferred that the step 24 comprises that a calculation formula of the degree $$d_n^{spa}\left(v_{p,n}^{(i)}\right)$$

of the vertex $$v_{p,n}^{(i)} \in \mathcal{V}_n^{spa}$$

in the n-th spatial hypergraph is:

$$d_n^{spa}(e_{m,n}^{spa}) = \sum_{e_{m,n}^{spa} \in \varepsilon_n^{spa}} w_n^{spa}(e_{m,n}^{spa}) H_n^{spa}(v_{p,n}^{(i)}, e_{m,n}^{spa})$$

wherein $$W_n^{spa}(e_{m,n}^{spa})$$

is a weight vector of the hyperedge $$e_{m,n}^{spa}.$$

In any of the above solutions, it is preferred that the step 24 further comprises that a calculation formula of the degree $$\delta_n^{spa}(e_{m,n}^{spa})$$

of the hyperedge $$e_{m,n}^{spa} \in \varepsilon_n^{spa}$$

in the n-th spatial hypergraph is:

$$\delta_n^{spa}(e_{m,n}^{spa}) = \sum_{v_{p,n}^{(i)} \in v_n^{spa}} H_n^{spa}(v_{p,n}^{(i)}, e_{m,n}^{spa})$$

wherein $D_{e_n}$ and $D_{v_n}$ represent diagonal matrices of the degrees of the hyperedges and the degrees of the vertices in the n-th spatial hypergraph respectively.

In any of the above solutions, it is preferred that a calculation formula of the Laplace matrix $$G_n^{spa}$$

is:

$$G_n^{spa} = D_{v_n}^{-1/2} H_n^{spa} W_n^{spa} D_{e_n}^{-1} (H_n^{spa})^T D_{v_n}^{-1/2}$$

wherein $$D_{v_n}^{-1/2}$$

represents square root of an inverse matrix of the diagonal matrix which is composed of the degrees of the vertices in the n-th spatial hypergraph, and $$D_{\varepsilon_n}^{-1}$$

represents an inverse matrix of the diagonal matrix which is composed of the degrees of the hyperedges in the n-th spatial hypergraph.

In any of the above solutions, it is preferred that the temporal hypergraph is a hypergraph $\mathcal{G}^{tem}=(\mathcal{V}^{tem}, \varepsilon^{tem}, W^{tem})$ that is constructed by using the joints as vertices, dividing sequence frames of the same view into a set, and connecting the same joints of the sequence frames of the same view with hyperedges, wherein $\mathcal{V}^{tem}$ represents a vertex set of the temporal hypergraph, $\varepsilon^{tem}$ represents a hyperedge set of the temporal hypergraph, and $W^{tem}$ represents weight of each hyperedge in the hyperedge set of the temporal hypergraph, which is a weight matrix.

In any of the above solutions, it is preferred that a method of constructing the temporal hypergraph comprises the following sub-steps:

step 31: initializing initial vertex features of each temporal hypergraph as a feature matrix $X_p$, each row of the matrix being coordinates of the joints of human;

step 32: generating the hypergraph $\mathcal{G}_p^{tem}$ by P views;

step 33: constructing an incidence matrix based on the vertex set and hyperedge set;

step 34: computing degrees $$d_p^{tem}(v_{p,n}^{(i)})$$

of the vertices in the temporal hypergraph of the p-th view and degrees $$\delta_p^{tem}(e_{q,p}^{tem})$$

of the hyperedges in the temporal hypergraph of the p-th view, step 35: optimizing the network using higher order information, and generating a Laplace matrix $$G_p^{tem}$$

by performing Laplace transformation of the incidence matrix $$H_p^{tem}.$$

In any of the above solutions, it is preferred that the step 33 comprises that the incidence matrix $$H_p^{tem}$$

of the p-th temporal hypergraph represents topology of the p-th temporal hypergraph, and a corresponding element in the matrix is 1 if the vertex exists in a certain hyperedge, or 0 otherwise.

In any of the above solutions, it is preferred that the incidence matrix of each temporal hypergraph is defined as:

$$H_v^{tem}(v_{p,n}^{(i)}, e_{q,p}^{tem}) = \begin{cases} 1 & v_{p,n}^{(i)} \in e_{q,p}^{tem} \\ 0 & v_{p,n}^{(i)} \notin e_{q,p}^{tem} \end{cases}$$

wherein $$e_{q,p}^{tem}$$

represents the q-th hyperedge in the p-th temporal hypergraph, q=1, 2, . . . , Q, and Q is the number of hyperedges in a temporal hypergraph, there are P incidence matrices of the temporal hypergraph.

In any of the above solutions, it is preferred that a calculation formula of the degree $$d_p^{tem}(v_{p,n}^{(i)})$$

of the vertex $$v_{p,n}^{(i)} \in \mathcal{V}_p^{tem}$$

in the temporal hypergraph of the p-th view is:

$$d_n^{tem}(v_{p,n}^{(i)}) = \sum_{e_{q,p}^{tem} \in \varepsilon_p^{spa}} w_p^{tem}(e_{q,p}^{tem}) H_p^{tem}(v_{p,n}^{(i)}, e_{q,p}^{tem})$$

wherein $$W_p^{tem}(e_{q,p}^{tem})$$

is a weight vector of the hyperedge $$e_{q,p}^{tem}.$$

In any of the above solutions, it is preferred that a calculation formula of the degree $$\delta_p^{tem}(e_{q,p}^{tem})$$

of the hyperedge $$e_{q,p}^{tem} \in \mathcal{E}_p^{tem}$$

in the temporal hypergraph of the p-th view is:

$$\delta_n^{tem}(e_{q,p}^{tem}) = \sum_{v_{p,n}^{(i)} \in v_p^{tem}} H_p^{tem}(v_{p,n}^{(i)}, e_{q,p}^{tem})$$

wherein $D_{e_p}$ and $D_{v_p}$ represent diagonal matrices of the degrees of the hyperedges and the degrees of the vertices in the p-th temporal hypergraph respectively.

In any of the above solutions, it is preferred that a calculation formula of the Laplace matrix $$G_p^{tem}$$

is:

$$G_p^{tem} = D_{v_p}^{-1/2} H_p^{tem} W_p^{tem} D_{e_p}^{-1} (H_p^{tem})^T D_{v_p}^{-1/2}$$

wherein $$D_{v_p}^{-1/2}$$

represents square root of an inverse matrix of the diagonal matrix which is composed of the degrees of the vertices in the p-th temporal hypergraph, and $$D_{e_p}^{-1}$$

represents an inverse matrix of the diagonal matrix which is composed of the degrees of the hyperedges in the p-th temporal hypergraph.

In any of the above solutions, it is preferred that the hypergraph neural networks comprise a spatial hypergraph neural network and a temporal hypergraph neural network.

In any of the above solutions, it is preferred that the spatial hypergraph neural network comprises two spatial hypergraph basic blocks, each spatial hypergraph basic block comprises two branches, and each branch comprises a 1×1 convolutional layer and a pooling layer.

In any of the above solutions, it is preferred that a method of constructing the spatial hypergraph neural network comprises the following sub-steps:

step 401: feature matrices obtained by the two branches are spliced, and a spliced feature matrix is trained using a multilayer perceptron MLP; step 402: features are aggregated by the 1×1 convolutional layer, and aggregated features are elementally added to a corresponding matrix, wherein for one spatial hypergraph basic block, the aggregated features are added to the matrix $$G_n^{spa},$$

and for the other hypergraph basic block, aggregated features are added to a autocorrelation matrix I;

step 403: feature matrices obtained by the two spatial hypergraph basic blocks are spliced, and a spliced feature matrix is an output of the spatial hypergraph neural network.

In any of the above solutions, it is preferred that the temporal hypergraph neural network comprises 10 layers, wherein a first temporal hypergraph basic block is used in the first layer, a second temporal hypergraph basic block is used in other layers, so as to achieve effective learning and training of time-series feature information.

In any of the above solutions, it is preferred that the first temporal hypergraph basic block uses the vertex features X as an input of five branches, each branch contains a 1×1 convolutional layer to reduce the number of channel dimensions; the first branch and the second branch contain two temporal convolutions with different expansion rates respectively, in order to reduce the number of parameters and extract the feature information of different periods; and the third branch and the fifth branch contain a 3×1 max pooling layer respectively, in order to remove redundant information and concatenate results of the five branches to obtain an output.

In any of the above solutions, it is preferred that the second temporal hypergraph basic block divides the vertex features X equally into two parts X1, X2, X1 is used as an input of the first four branches, and X2 is used as an input of the fifth branch; each branch contains the same network layers as the first temporal hypergraph basic block.

In any of the above solutions, it is preferred that the step 5 comprises the following sub- steps:

step 51: training the spatial hypergraph neural network to obtain spatial hypergraph features;

step 52: training the temporal hypergraph neural network to obtain temporal hypergraph features;

step 53: fusing the spatial hypergraph features with the temporal hypergraph features; step 54: calculating probability values of action prediction using Softmax;

step 55: extracting a corresponding action category with the largest probability value as a prediction category.

In any of the above solutions, it is preferred that the step 51 comprises using the initialized feature matrix $X_n$, the Laplace matrix $$G_n^{spa},$$

and the autocorrelation matrix I as inputs of the spatial hypergraph neural network, and $f_{spatial}$ is an output of the spatial hypergraph neural network, representing the spatial hypergraph features.

In any of the above solutions, it is preferred that the initialized feature matrix $X_p$, the Laplace matrix $$G_p^{tem}$$

are used as inputs of the temporal hypergraph neural network, wherein $$G_p^{tem}$$

is input only to the fifth branch of the temporal hypergraph basic block, and $f_{temporal}$ is an output of the temporal hypergraph neural network, representing the temporal hypergraph features.

The present invention provides a multi-view human action recognition method based on hypergraph learning, which solves the problems such as low accuracy of action recognition caused by object occlusion, insufficient light, weak correlation of joints of the human body, and so on in complex scenes, the method has advantages of high efficiency and reliability, makes action recognition be applied in more comprehensive and more complex scenes, and has the following beneficial effects:

(1) data of human actions is collected from multiple views, the problem of human body being obscured is solved through multiple views;

(2) temporal correlations of human actions are modeled by constructing the temporal hypergraphs; higher order correlations of various parts of the human body are modeled by constructing spatial hypergraphs; compared with traditional graph structure modeling, hypergraph modeling can solve the problem of weak correlations of joints of the human body;

(3) higher order semantics of the temporal hypergraphs and the spatial hypergraphs are learned using the temporal hypergraph neural network and the spatial hypergraph neural network respectively, so feature representation of human actions is further learned, and action recognition is better realized.

DETAILED DESCRIPTION OF THE EMBODIMENTS

Further description of the present invention is provided below with reference to specific embodiments and drawings.

Embodiment 1

Figure 1:
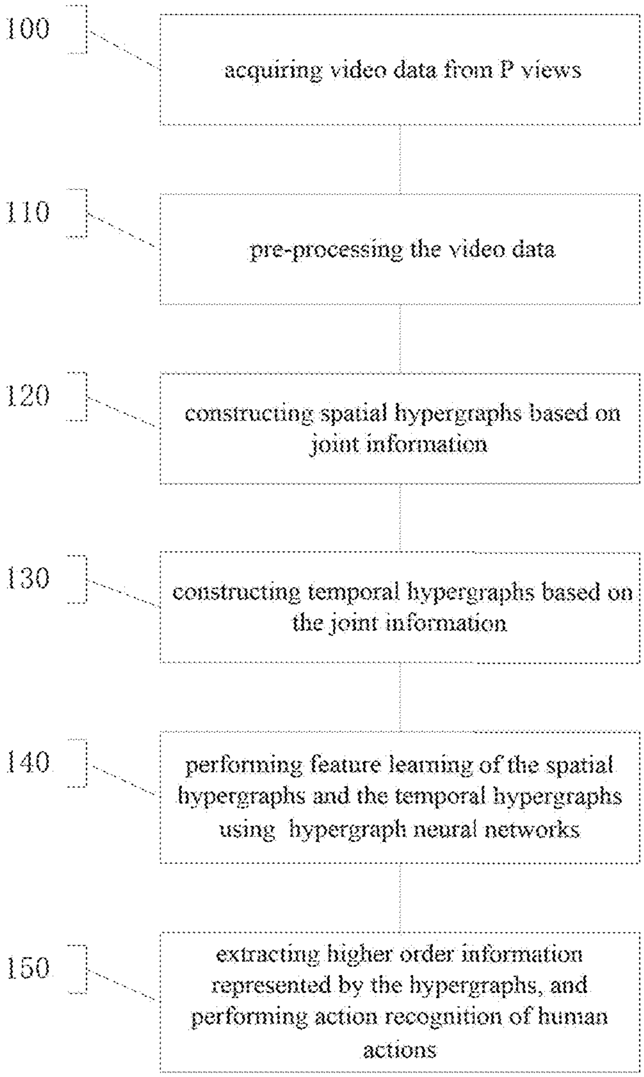
FIG. 1 is a flowchart of a preferred embodiment of a multi-view human action recognition method based on hypergraph learning according to the present invention.

As shown in FIG. 1, step 100 is executed to obtain video data from P views.

Step 110 is executed to preprocess the video data. A method of preprocessing the video data comprises: segmenting the video data into N frames, extracting joint information of each frame using Openpose, storing the joint information in a json file by saving x and y coordinates of joints, and constructing spatial hypergraphs and temporal hypergraphs according to the joint information.

Step 120 is executed to construct the spatial hypergraphs based on the joint information. The spatial hypergraph is a hypergraph $\mathcal{G}^{spa}=(\mathcal{V}^{spa}, \varepsilon^{spa}, W^{spa})$ that is constructed according to a limb composition strategy by using the joints as vertices, dividing a human body into five parts which are a trunk, a left hand, a right hand, a left leg and a right leg, and connecting joints of the same part in different views at the same moment using a hyperedge, and that is used to achieve an aggregation of spatial information of the joints, wherein $\mathcal{V}^{spa}$ represents a vertex set of the spatial hypergraph, $\varepsilon^{spa}$ represents a hyperedge set of the spatial hypergraph, and $W^{spa}$ represents weight of each hyperedge in the hyperedge set of the spatial hypergraph, which is a weight matrix. A method of constructing the spatial hypergraph comprises the following sub-steps.

Step 121 is executed to initialize initial vertex features of each spatial hypergraph as a feature matrix $X_n$, each row of the matrix is the coordinates of the joints of human.

Step 122 is executed to generate the n-th spatial hypergraph $$\mathcal{G}_n^{spa},$$

a calculation formula is:

$$\mathcal{G}_n^{spa}=(\mathcal{V}_n^{spa}, \mathcal{E}_n^{spa}, W_n^{spa})$$

wherein $$\mathcal{V}_n^{spa}$$

represents the vertex set of the n-th spatial hypergraph, $$\mathcal{E}_n^{spa}$$

represents the hyperedge set of the n-th spatial hypergraph, and $$W_n^{spa}$$

represents the weight of each hyperedge in the n-th spatial hypergraph, n=1,2, . . . , N.

Step 123 is executed to construct an incidence matrix based on the vertex set and the hyperedge set. The incidence matrix $$H_n^{spa}$$

of the n-th spatial hypergraph represents topology of the n-th spatial hypergraph; if the vertex exists in a certain hyperedge, a corresponding element in the matrix is 1, and 0 otherwise. The incidence matrix of each spatial hypergraph is defined as:

$$H_n^{spa}(v_{p,n}^{(i)}, e_{m,n}^{spa})=\begin{cases}1 & v_{p,n}^{(i)}\in e_{m,n}^{spa}\\ 0 & v_{p,n}^{(i)}\notin e_{m,n}^{spa}\end{cases}$$

wherein $$v_{p,n}^{(i)}$$

represents the i-th joint in the n-th frame of the p-th view, and $$e_{m,n}^{spa}$$

represents the m-th hyperedge in the n-th spatial hypergraph, wherein m=1, 2, . . . , M, and M is the number of hyperedges in a spatial hypergraph.

Step 124 is executed to calculate degrees $$d_n^{spa}(v_{p,n}^{(i)})$$

of the vertices in the n-th spatial hypergraph and degrees $$\delta_n^{spa}(e_{m,n}^{spa})$$

of the hyperedges in the n-th spatial hypergraph. A calculation formula of the degree $$d_n^{spa}(v_{p,n}^{(i)})$$

of the vertex $$v_{p,n}^{(i)}\in\mathcal{V}_n^{spa}$$

in the n-th spatial hypergraph is:

$$d_n^{spa}\left(v_{p,n}^{(i)}\right) = \sum_{e_{m,n}^{spa} \in \varepsilon_n^{spa}} w_n^{spa}\left(e_{m,n}^{spa}\right) H_n^{spa}\left(v_{p,n}^{(i)}, e_{m,n}^{spa}\right)$$

wherein $$d_n^{spa}$$

represents a function for computing the degrees of vertices in the n-th spatial hypergraph, $$\delta_n^{spa}$$

represents a function for computing the degrees of hyperedges in the n-th spatial hypergraph, and $$W_n^{spa}\left(e_{m,n}^{spa}\right)$$

is a weight vector of the hyperedge $$e_{m,n}^{spa}$$

A calculation formula of the degree $$\delta_n^{spa}\left(e_{m,n}^{spa}\right)$$

of the hyperedge $$e_{m,n}^{spa} \in \mathcal{E}_n^{spa}$$

in the n-th spatial hypergraph is:

$$\delta_n^{spa}\left(e_{m,n}^{spa}\right) = \sum_{v_{p,n}^{(i)} \in v_n^{spa}} H_n^{spa}\left(v_{p,n}^{(i)}, e_{m,n}^{spa}\right)$$

wherein $D_{e_n}$ and $D_{v_n}$ represent diagonal matrices of the degrees of the hyperedges and the degrees of the vertices in the n-th spatial hypergraph respectively.

Step 125 is executed to optimize a network using higher order information, and generate a Laplace matrix $$G_n^{spa}$$

by performing Laplace transformation of the incidence matrix $$H_n^{spa}.$$

A calculation formula is:

$$G_n^{spa} = D_{v_n}^{-1/2} H_n^{spa} D_{e_n}^{-1} (H_n^{spa})^T D_{v_n}^{-1/2}$$

wherein $$D_{v_n}^{-1/2}$$

represents square root of an inverse matrix of the diagonal matrix which is composed of the degrees of the vertices in the n-th spatial hypergraph, and $$D_{e_n}^{-1}$$

represents an inverse matrix of the diagonal matrix which is composed of the degrees of the hyperedges in the n-th spatial hypergraph.

Step 130 is executed to construct the temporal hypergraphs based on the joint information. The temporal hypergraph is a hypergraph $\mathcal{V}^{tem}=(\mathcal{G}^{tem}, \varepsilon^{tem}, W^{tem})$ that is constructed by using the joints as vertices, dividing sequence frames of the same view into a set, and connecting the same joints of the sequence frames of the same view with hyperedges, wherein $\mathcal{V}^{tem}$ represents a vertex set of the temporal hypergraph, $\varepsilon^{tem}$ represents a hyperedge set of the temporal hypergraph, and $W^{tem}$ represents weight of each hyperedge in the hyperedge set of the temporal hypergraph, which is a weight matrix. A method of constructing the temporal hypergraph comprises the following sub-steps.

Step 131 is executed to initialize initial vertex features of each temporal hypergraph as a feature matrix $X_p$, each row of the matrix is coordinates of joints of human.

Step 132 is executed to generate hypergraph $$\mathcal{G}_p^{tem} = \left(\mathcal{V}_p^{tem}, \varepsilon_p^{tem}, W_p^{tem}\right)$$

of by P views, $$p = 1, 2, \ldots, P, \text{ wherein } \mathcal{G}_p^{tem}$$

represents the p-th temporal hypergraph, $$\mathcal{V}_p^{tem}$$

represents a vertex set of the p-th temporal hypergraph, $$\varepsilon_p^{tem}$$

represents a hyperedge set of the p-th temporal hypergraph, and $$W_p^{tem}$$

represents weight of each hyperedge in the p-th temporal hypergraph.

Step 133 is executed to construct an incidence matrix based on the vertex set and the hyperedge set. The incidence matrix $$H_p^{tem}$$

of the p-th temporal hypergraph represents topology of the p-th temporal hypergraph. If the vertex exists in a certain hyperedge, a corresponding element in the matrix is 1, and 0 otherwise. The incidence matrix of each temporal hypergraph is defined as:

$$H_p^{tem}\left(v_{p,n}^{(i)}, e_{q,p}^{tem}\right) = \begin{cases} 1 & v_{p,n}^{(i)} \in e_{q,p}^{tem} \\ 0 & v_{p,n}^{(i)} \notin e_{q,p}^{tem} \end{cases}$$

wherein $$e_{q,p}^{tem}$$

represents the q-th hyperedge in the p-th temporal hypergraph, q=1, 2, . . . , Q, and Q is the number of hyperedges in a temporal hypergraph, there are P incidence matrices of the temporal hypergraph.

Step 134 is executed to calculate degrees $$d_p^{tem}\left(v_{p,n}^{(i)}\right)$$

of the vertices in the temporal hypergraph of the p-th view, and degrees $$\delta_p^{tep}\left(e_{q,p}^{tem}\right)$$

of the hyperedges in the temporal hypergraph of the p-th view. A calculation formula of the degree $$d_p^{tem}\left(v_{p,n}^{(i)}\right)$$

of the vertex $$v_{p,n}^{(i)} \in \mathcal{V}_p^{tem}$$

in the temporal hypergraph of the p-th view is:

$$d_p^{tem}\left(v_{p,n}^{(i)}\right) = \sum_{e_{q,p}^{tem} \in \varepsilon_p^{tem}} W_p^{tem}\left(e_{q,p}^{tem}\right) H_p^{tem}\left(v_{p,n}^{(i)}, e_{q,p}^{tem}\right)$$

wherein $$W_p^{tem}\left(e_{q,p}^{tem}\right)$$

is a weight vector of the hyperedge $$e_{q,p}^{tem}.$$

A calculation formula of the degree $$\delta_p^{tem}\left(e_{q,p}^{tem}\right)$$

of the hyperedge $$e_{q,p}^{tem} \in \varepsilon_p^{tem}$$

in the temporal hypergraph of the p-th view is:

$$\delta_p^{tem}\left(e_{q,p}^{tem}\right) = \sum_{v_{p,n}^{(i)} \in v_p^{tem}} H_p^{tem}\left(v_{p,n}^{(i)}, e_{q,p}^{tem}\right)$$

wherein $D_{e_p}$ and $D_{v_p}$ represent diagonal matrices of the degrees of the hyperedges and the degrees of the vertices in the p-th temporal hypergraph respectively.

Step 135 is executed to optimize a network using higher order information, and generate a Laplace matrix $$G_p^{tem}$$

by performing Laplace transformation of the incidence matrix $$H_p^{tem}.$$

A calculation formula is:

$$G_p^{tem} = D_{v_p}^{-1/2} H_p^{tem} W_p^{tem} D_{e_p}^{-1} \left(H_p^{tem}\right)^T D_{v_p}^{-1/2}$$

wherein $$D_{v_p}^{-1/2}$$

represents square root of an inverse matrix of the diagonal matrix which is composed of the degrees of the vertices in the p-th temporal hypergraph, and $$D_{e_p}^{-1}$$

represents an inverse matrix of the diagonal matrix which is composed of the degrees of the hyperedges in the p-th temporal hypergraph.

Step 140 is executed to perform feature learning of the spatial hypergraphs and the temporal hypergraphs using hypergraph neural networks. The hypergraph neural networks comprise a spatial hypergraph neural network and a temporal hypergraph neural network.

The spatial hypergraph neural network comprises two spatial hypergraph basic blocks, each spatial hypergraph basic block comprises two branches, and each branch comprises a 1×1 convolutional layer and a pooling layer. A method of constructing the spatial hypergraph neural network comprises the following sub-steps:

step 141 is executed, feature matrices obtained by the two branches are spliced, and a spliced feature matrix is trained using a multilayer perceptron MLP;

step 142 is executed, features are aggregated by the 1×1 convolutional layer, and aggregated features are elementally added to a corresponding matrix, wherein for one spatial hypergraph basic block, the aggregated features are added to the matrix $$G_n^{spa},$$

and for the other hypergraph basic block, the aggregated features are added to a autocorrelation matrix I;

step 143 is executed, feature matrices obtained by the two spatial hypergraph basic blocks are spliced, and a spliced feature matrix is an output of the spatial hypergraph neural network.

The temporal hypergraph neural network comprises 10 layers, wherein a first temporal hypergraph basic block is used in the first layer, a second temporal hypergraph basic block is used in other layers, so as to achieve effective learning and training of time-series feature information. The first temporal hypergraph basic block uses the vertex features X as an input of five branches, each branch contains a 1×1 convolutional layer to reduce the number of channel dimensions; the first branch and the second branch contain two temporal convolutions with different expansion rates respectively, in order to reduce the number of parameters and extract the feature information of different periods; the third branch and the fifth branch contain a 3×1 max pooling layer respectively, in order to remove redundant information and concatenate results of the five branches to obtain an output. The second temporal hypergraph basic block divides the vertex features X equally into two parts X1 and X2, X1 is used as an input of the first four branches, X2 is used as an input of the fifth branch, each branch contains the same network layers as the first temporal hypergraph basic block.

Step 150 is executed to extract higher order information represented by the hypergraphs and perform action recognition of human actions. The step 150 comprises the following sub- steps.

Step 151 is executed to train the spatial hypergraph neural network to obtain spatial hypergraph features. The initialized feature matrix $X_n$, the Laplace matrix $$G_n^{spa},$$

and the autocorrelation matrix I are used as inputs of the spatial hypergraph neural network, and $f_{spatial}$ is an output of the spatial hypergraph neural network, denoting the spatial hypergraph features.

Step 152 is executed to train the temporal hypergraph neural network to obtain temporal hypergraph features. and the initialized feature matrix $X_p$ and the Laplace matrix $$G_p^{tem}$$

are used as inputs of the temporal hypergraph neural network, wherein $$G_p^{tem}$$

is input only to the fifth branch of the temporal hypergraph basic block, and $f_{temporal}$ is an output of the temporal hypergraph neural network, representing temporal hypergraph features.

Step 153 is executed to fuse the spatial hypergraph features and the temporal hypergraph features.

Step 154 is executed to calculate probability values of action prediction using Softmax.

Step 155 is executed to extract a corresponding action category with the largest probability value as a prediction category.

Embodiment 2

Figure 2:
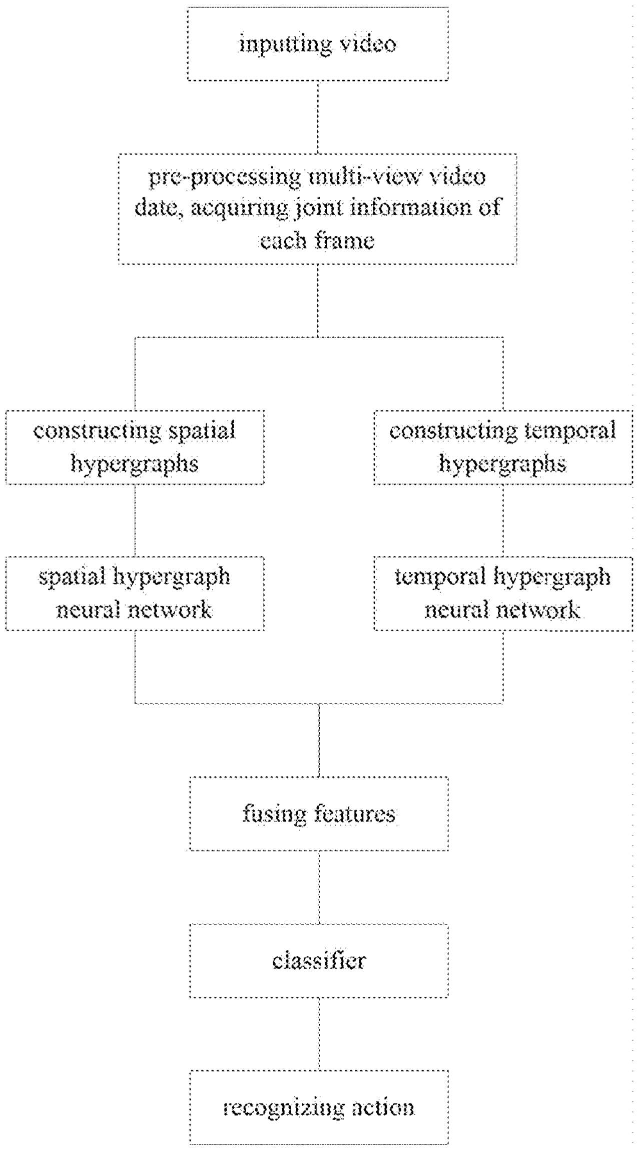
FIG. 2 is a flowchart of another preferred embodiment of the multi-view human action recognition method based on hypergraph learning according to the present invention.

In order to realize accurate recognition of human action in complex environments, as shown in FIG. 2, the present invention provides a multi-view human action recognition method based on hypergraph learning, which realizes human action recognition in the complex environments by recognizing video sequences of different views, performing temporal and spatial modeling of a human body by using hypergraphs, and learning the hypergraphs by using hypergraph neural networks.

1. Acquisition of Video

Different cameras are used to acquire video data, and the multi-view video data is preprocessed. The video data is obtained from P views and is used as an input, the video data is divided into N frames, joint information of each frame is extracted using Openpose, the joint information is stored in a json file by saving x and y coordinates of joints, and spatial hypergraphs and temporal hypergraphs are constructed according to the joint information.

2. Construction of Spatial Hypergraph (1) For the spatial hypergraph, a spatial hypergraph $\mathcal{G}=(\mathcal{V}^{spa}, \varepsilon^{spa}, W^{spa})$ is constructed according to a limb composition strategy by using the joints as vertices, dividing human body into five parts which are a trunk, a left hand, a right hand, a left leg and a right leg, and connecting the joints of the same part in different views at the same moment using a hyperedge, so as to realize an aggregation of spatial information of joints, wherein $\mathcal{V}^{spa}$ represents a vertex set of the spatial hypergraph, $\varepsilon^{spa}$ represents a hyperedge set of the spatial hypergraph, and $W^{spa}$ represents weight of each hyperedge in the hyperedge set of the spatial hypergraph, which is a weight matrix.

(2) Initial vertex features of each spatial hypergraph are initialized as a feature matrix $X_n$, and each row of the matrix is coordinates the joints of human.

(3) Since N frames are extracted from each video sequence, multiple hypergraphs $$\mathcal{G}_n^{spa}=(\mathcal{V}_p^{spa},\varepsilon_p^{spa},w_p^{spa})$$

can be generated by N frames, wherein $$n=1,2,\ldots,N,\mathcal{G}_n^{spa}$$

represents the n-th spatial hypergraph, $$v_n^{spa}$$

represents the vertex set of the n-th spatial hypergraph, $$\varepsilon_n^{spa}$$

represents the hyperedge set of the n-th spatial hypergraph, $$w_n^{Spa}$$

represents the weight of each hyperedge of the n-th spatial hypergraph.

(4) An incidence matrix is constructed according to the vertex set and the hyperedge set. The incidence matrix $$H_n^{spa}$$

of the n-th spatial hypergraph represents topology of the n-th spatial hypergraph. If the vertex exists in a certain hyperedge, a corresponding element in the matrix is 1, and 0 otherwise. The incidence matrix of each spatial hypergraph is defined as:

$$H_n^{spa}(v_{p,n}^{(i)},e_{m,n}^{spa})=\begin{cases}1 & v_{p,n}^{(i)}\in e_{m,n}^{spa}\\ 0 & v_{p,n}^{(i)}\notin e_{m,n}^{spa}\end{cases}$$

wherein $$v_{p,n}^{(i)}$$

represents the i-th joint in the n-th frame of the path view, and $$e_{m,n}^{spa}$$

represents the m-th hyperedge in the n-th spatial hypergraph, wherein m=1, 2, . . . , M, and M is the number of hyperedges in a spatial hypergraph; n=1, 2, . . . . N, there are N incidence matrices of the spatial hypergraph.

(5) A degree $$d_n^{spa}(v_{p,n}^{(i)})$$

of the vertex $$v_{p,n}^{(i)}\in\mathcal{V}_n^{spa}$$

in the n-th spatial hypergraph is calculated by a formula:

$$d_n^{spa}(v_{p,n}^{(i)})=\sum_{e_{m,n}^{spa}\in\varepsilon_n^{spa}}W_n^{spa}(e_{m,n}^{spa})H_n^{spa}(v_{p,n}^{(i)},e_{m,n}^{spa})$$

wherein $$W_n^{spa}(e_{m,n}^{spa})$$

is a weight vector of the hyperedge $$e_{m,n}^{spa}.$$

A degree $$\delta_n^{spa}(e_{m,n}^{spa})$$

of the hyperedge $$e_{m,n}^{spa}\in\varepsilon_n^{spa}$$

in the n-th spatial hypergraph is calculated by a formula:

$$\delta_n^{spa}(e_{m,n}^{spa})=\sum_{v_{p,n}^{(i)}\in v_n^{spa}}H_n^{spa}(v_{p,n}^{(i)},e_{m,n}^{spa})$$

wherein $D_{e_n}$ and $D_{v_n}$ represent diagonal matrices of the degrees of the hyperedges and the degrees of the vertices in the n-th spatial hypergraph, respectively.

(6) In order to optimize a network using higher order information, a Laplace matrix $$G_n^{spa}$$

is generated by performing Laplace transformation of the incidence matrix $$H_n^{spa},$$

a calculation formula is:

$$G_n^{spa} = D_{v_n}^{-1/2} H_n^{spa} W_n^{spa} D_{e_n}^{-1} (H_n^{spa})^T D_{v_n}^{-1/2}.$$

3. Construction of Temporal Hypergraph (1) For the temporal hypergraph, a temporal hypergraph $\mathcal{G}^{tem}=(\mathcal{V}^{tem}, \varepsilon^{tem}, W^{tem})$ is constructed by using the joints as vertices, dividing sequence frames of the same view into a set, and connecting the same joints of the sequence frames of the same view with hyperedges , wherein $\mathcal{V}^{tem}$ represents a vertex set of the temporal hypergraph, $\varepsilon^{tem}$ represents a hyperedge set of the temporal hypergraph, and $W^{tem}$ represents weight of each hyperedge in the hyperedge set of the temporal hypergraph, which is a weight matrix.

(2) Initial vertex features of each temporal hypergraph are initialized as a feature matrix $X_p$, and each row of the matrix is the coordinates of the joints of human.

(3) Since there are P views, multiple hypergraphs $$\mathcal{G}_p^{tem} = (\mathcal{V}_p^{tem}, \varepsilon_p^{tem}, w_p^{tem})$$

can be generated by P views, wherein $$p = 1, 2, \ldots, P, \mathcal{G}_p^{tem}$$

represents the p-th temporal hypergraph, $\mathcal{V}^{tem}$ represents the vertex set the p-th temporal hypergraph, $\varepsilon^{tem}$ represents the hyperedge set of the p-th temporal hypergraph, and $W^{tem}$ represents the weight of each hyperedge of the p-th temporal hypergraph.

(4) An incidence matrix is constructed based on the vertex set and the hyperedge set. The incidence matrix $$H_p^{tem}$$

of the p-th temporal hypergraph represents topology of the p-th temporal hypergraph. If the vertex exists in a certain hyperedge, a corresponding element in the matrix is 1, and 0 otherwise. The incidence matrix of each temporal hypergraph is defined as:

$$H_p^{tem}(v_{p,n}^{(i)}, e_{q,p}^{tem}) = \begin{cases} 1 & v_{p,n}^{(i)} \in e_{q,p}^{tem} \\ 0 & v_{p,n}^{(i)} \notin e_{q,p}^{tem} \end{cases}$$

wherein $$e_{q,p}^{tem}$$

represents the q-th hyperedge in the p-th temporal hypergraph, q=1, 2, . . . , Q, and Q is the number of hyperedges in a temporal hypergraph, there are P incidence matrices of the temporal hypergraph.

(5) A degree $$d_p^{tem}(v_{p,n}^{(i)})$$

of the vertex $$v_{p,n}^{(i)} \in \mathcal{V}_p^{tem}$$

in the temporal hypergraph of p-th view is calculated by a formula:

$$d_p^{tem}(v_{p,n}^{(i)}) = \sum_{e_{q,p}^{tem} \in \varepsilon_p^{tem}} W_p^{tem}(e_{q,p}^{tem}) H_p^{tem}(v_{p,n}^{(i)}, e_{q,p}^{tem})$$

wherein $$W_p^{tem}(e_{q,p}^{tem})$$

is a weight vector of the hyperedge $$e_{q,p}^{tem}.$$

A degree $$\delta_p^{tem}(e_{q,p}^{tem})$$

of the hyperedge $$e_{q,p}^{tem} \in \mathcal{E}_p^{tem}$$

in the temporal hypergraph of the p-th view is calculated by a formula:

$$\delta_p^{tem}(e_{q,p}^{tem}) = \sum_{v_{p,n}^{(i)} \in v_p^{tem}} H_p^{tem}(v_{p,n}^{(i)}, e_{q,p}^{tem})$$

wherein $D_{e_p}$ and $D_{v_p}$ represent diagonal matrices of the degrees of the hyperedges and the degrees of the vertices in the p-th temporal hypergraph, respectively.

(6) In order to optimize a network with higher order information, a Laplace matrix $$G_p^{tem}$$

is generated by performing Laplace transformation of the incidence matrix $$H_p^{tem},$$

a calculation formula is:

$$G_p^{tem} = D_{v_p}^{-1/2} H_p^{tem} W_p^{tem} D_{e_p}^{-1} (H_p^{tem})^T D_{v_p}^{-1/2}.$$

4. Feature Learning Of Hypergraphs Using Hypergraph Neural Networks

After the hypergraphs are constructed, a spatial hypergraph neural network is used to learn the features of the spatial hypergraphs, and a temporal hypergraph neural network is used to learn the features of the temporal hypergraphs, so as to extract the higher order information represented by the hypergraphs and recognize the human action.

(1) Construction of the Spatial Hypergraph Neural Network

For the spatial hypergraph neural network, it consists of two spatial hypergraph basic blocks, each spatial hypergraph basic block consists of two branches, each branch contains of a 1×1 convolutional layer and a pooling layer. Feature matrices obtained by the two branches are spliced, a spliced feature matrix is trained using a multilayer perceptron MLP; features are aggregated by the 1×1 convolutional layer, and aggregated features are elementally added to a corresponding matrix, wherein for one spatial hypergraph basic block, the aggregated features are added to the matrix $$G_n^{spa},$$

and for the other spatial hypergraph basic block, the aggregated features are added to a autocorrelation matrix 1; finally, feature matrices obtained by the two spatial hypergraph basic blocks are spliced, and a spliced feature matrix is an output of the spatial hypergraph neural network.

(2) Construction of the Temporal Hypergraph Neural Network

The temporal hypergraph neural network consists of ten layers, wherein a first temporal hypergraph basic block is used in the first layer, and a second temporal hypergraph basic block is used in the other layers, so that effective learning and training of time-series feature information can be realized. In order to conduct efficient learning and training and reduce computation in the network, the first temporal hypergraph basic block uses the vertex features X as an input of five branches, and each branch contains a 1×1 convolutional layer to reduce the number of channel dimensions; the first branch and the second branch contain two temporal convolutions with different expansion rates respectively, so as to reduce the number of parameters and extract the feature information of different periods; the third branch and the fifth branch contain a 3×1 max pooling layer respectively, so as to remove redundant information and concatenate results of the five branches to obtain an output. The second temporal hypergraph basic block divides the vertex features X into two parts X1 and X2 equally, XI is used as an input of the first four branches, X2 is used as an input of the fifth branch, and each branch contains the same network layers as the first temporal hypergraph basic block.

(3) Training and Testing

The initialized feature matrix $X_n$, the Laplace matrix $$G_n^{spa},$$

and the autocorrelation matrix I are used as inputs of the spatial hypergraph neural network, and $f_{spatial}$ is an output of the spatial hypergraph neural network, denoting the spatial hypergraph features. The initialized feature matrix $X_p$ and the Laplace matrix $$G_p^{tem}$$

are used as inputs of the temporal hypergraph neural network, wherein $$G_p^{tem}$$

is inputted to the fifth branch of the temporal hypergraph basic block only, and $f_{temporal}$ is an output of the temporal hypergraph neural network, representing temporal hypergraph features. Finally, obtained features are fused and probability values of action prediction are calculated by Softmax, and a final prediction category is the corresponding action category with the largest probability value.

Embodiment 3

Figure 3:
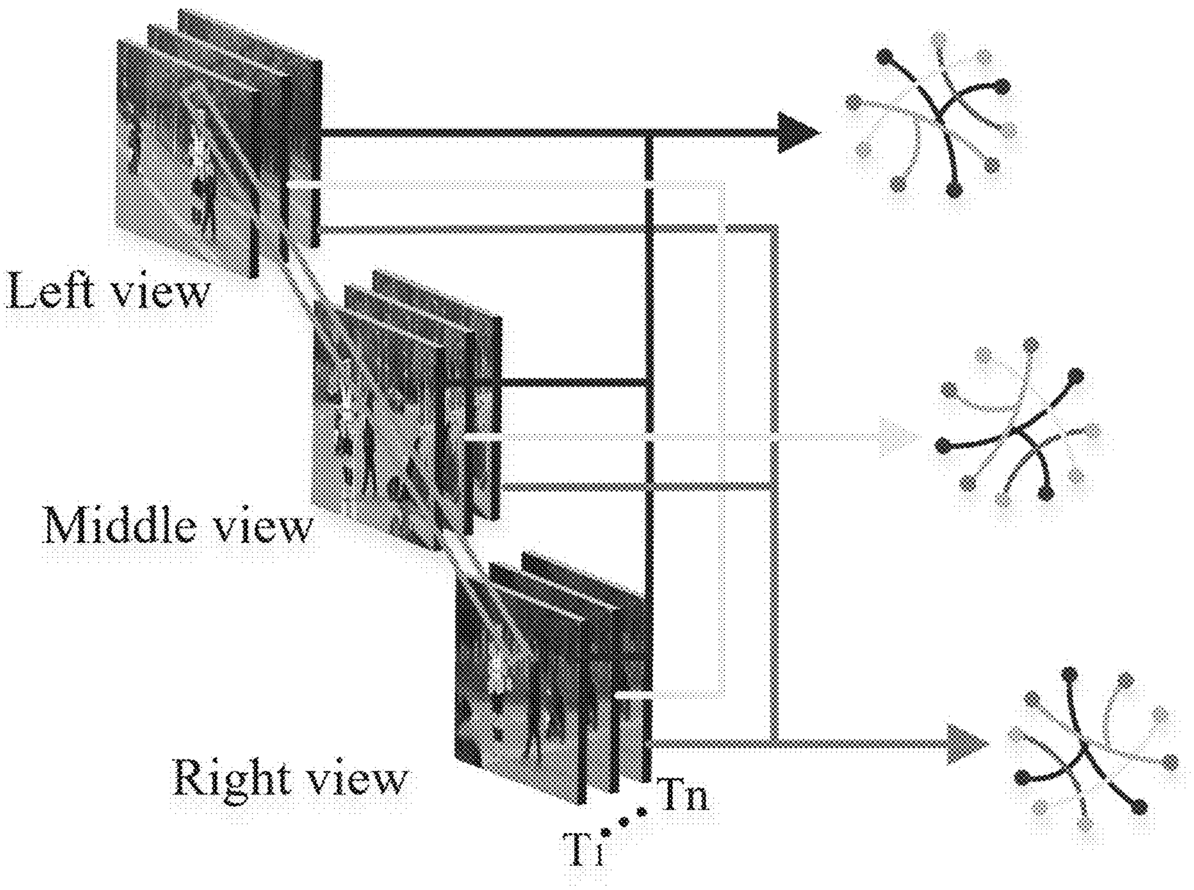
FIG. 3 is a schematic diagram of an embodiment of a spatial hypergraph construction process of the multi-view human action recognition method based on hypergraph learning according to the present invention.

FIG. 3 shows a schematic diagram of a construction process of a spatial hypergraph. In the present invention, all joints of human in different views at the same moment are taken to form a vertex set of the hypergraph, the joints at the same part in different views at the same moment are connected by a hyperedge, and all hyperedges are taken to form a hyperedge set of the hypergraph, the spatial hypergraph is constructed based on the vertex set of the hypergraph and the hyperedge set of the hypergraph. Since there are N frames for each view, a total of N spatial hypergraphs are constructed.

Embodiment 4

Figure 4:
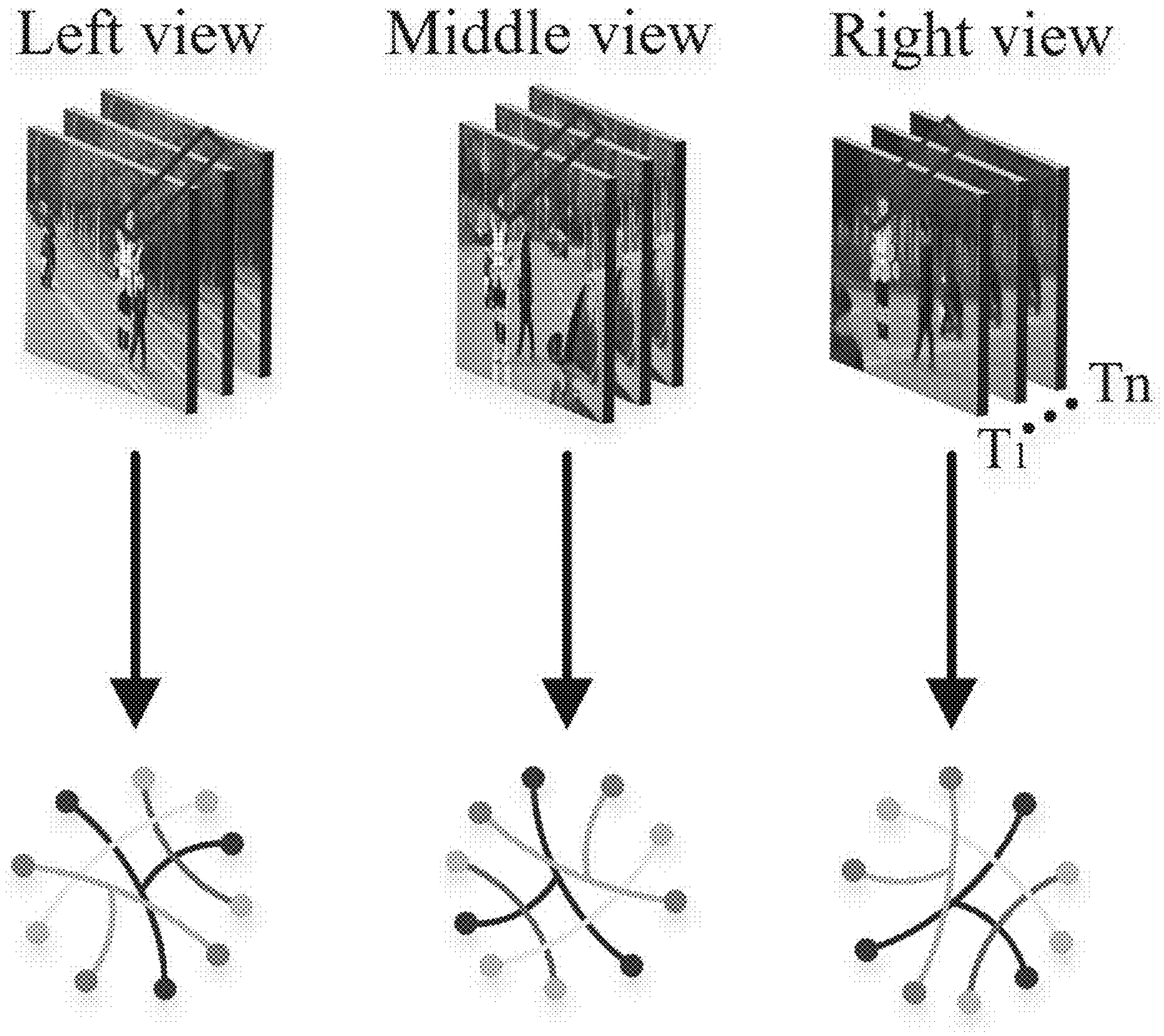
FIG. 4 is a schematic diagram of an embodiment of a temporal hypergraph construction process of the multi-view human action recognition method based on hypergraph learning according to the present invention.

FIG. 4 shows a schematic diagram of a construction process of a temporal hypergraph. In the present invention, all joints of human at different moments of the same view are taken to form a vertex set of the hypergraph, the same joints at different moments of the same view are connected by a hyperedge, and the all hyperedges are taken to form a hyperedge set of the hypergraph, the temporal hypergraph is constructed based on the vertex set of the hypergraph and the hyperedge set of the hypergraph. Since there are P views, a total of P temporal hypergraphs are constructed.

Embodiment 5

Figure 5:
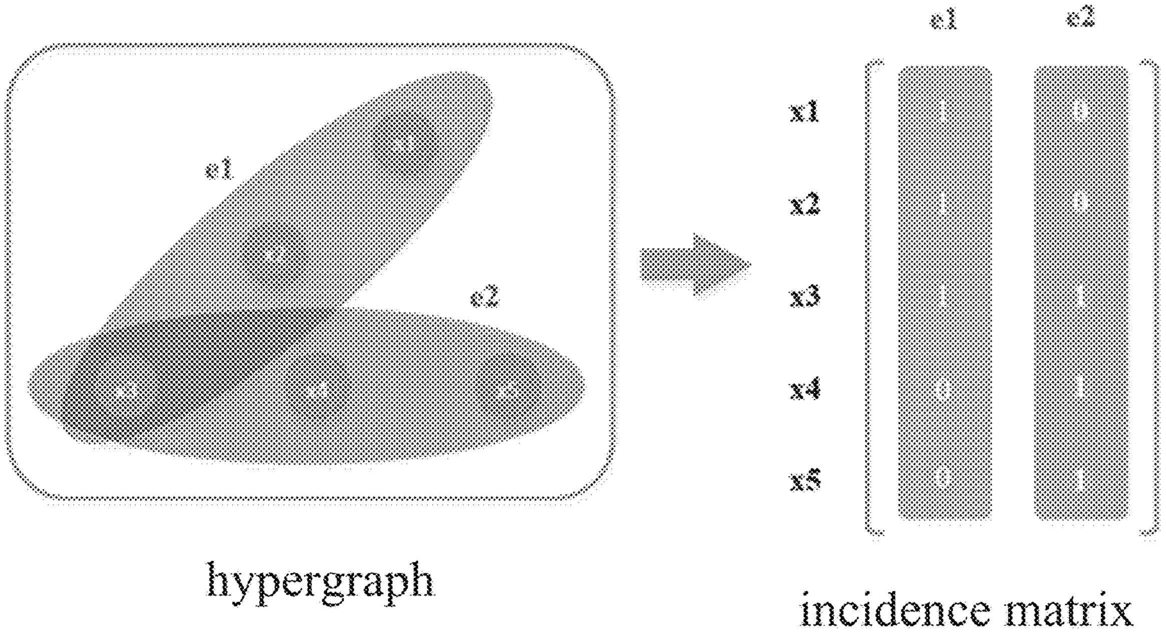
FIG. 5 is a schematic diagram of an embodiment of a transformation process from hypergraphs to an incidence matrix of the multi-view human action recognition method based on hypergraph learning according to the present invention.

If a hypergraph is defined as $\mathcal{G}=(\mathcal{V}, \varepsilon, W)$, wherein $\mathcal{G}$ is a vertex set of the hypergraph, and an element in the vertex set is denoted by $v \in \mathcal{V}$; ε is a hyperedge set of the hypergraph, and an element in the hyperedge set is denoted by e∈ε; W is a weight matrix of the hyperedge, which records weight value of each hyperedge denoted by ω(e), then relationships among the hyperedges and the vertices are represented by constructing a $|\mathcal{V}|\times|\varepsilon|$ incidence matrix H. Specifically, as shown in FIG. 5, if the vertex v exists in the hyperedge e, h(v, e) =1, otherwise h(v, e)=0.

Embodiment 6

Figure 6:
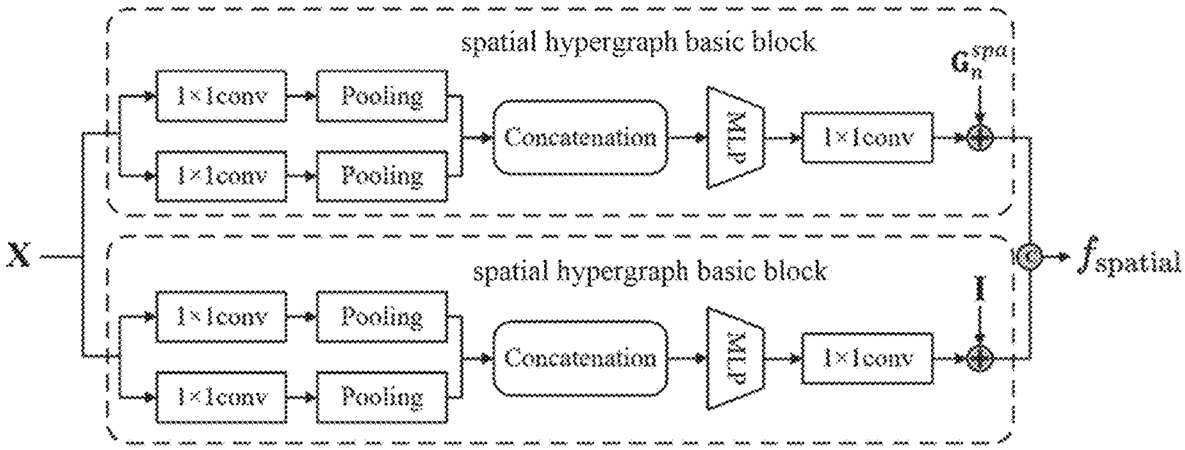
FIG. 6 is a schematic structural diagram of an embodiment of a spatial hypergraph neural network of the multi-view human action recognition method based on hypergraph learning according to the present invention.

As shown in FIG. 6, a spatial hypergraph neural network consists of two spatial hypergraph basic blocks, each spatial hypergraph basic block consists of two branches, each branch contains of a 1×1 convolutional layer and a pooling layer. Feature matrices obtained by the two branches are spliced, and a spliced feature matrix is trained using a multilayer perceptron MLP; features are aggregated by the 1×1 convolutional layer, and aggregated features are elementally added to a corresponding matrix, wherein for one spatial hypergraph basic block, the aggregated features are added to the matrix $$G_n^{spa},$$

and for the other spatial hypergraph basic block, the aggregated features are added to a autocorrelation matrix 1; finally, feature matrices obtained by the two spatial hypergraph basic blocks are spliced, and a spliced feature matrix is an output of the spatial hypergraph neural network.

Embodiment 7

Figure 7:
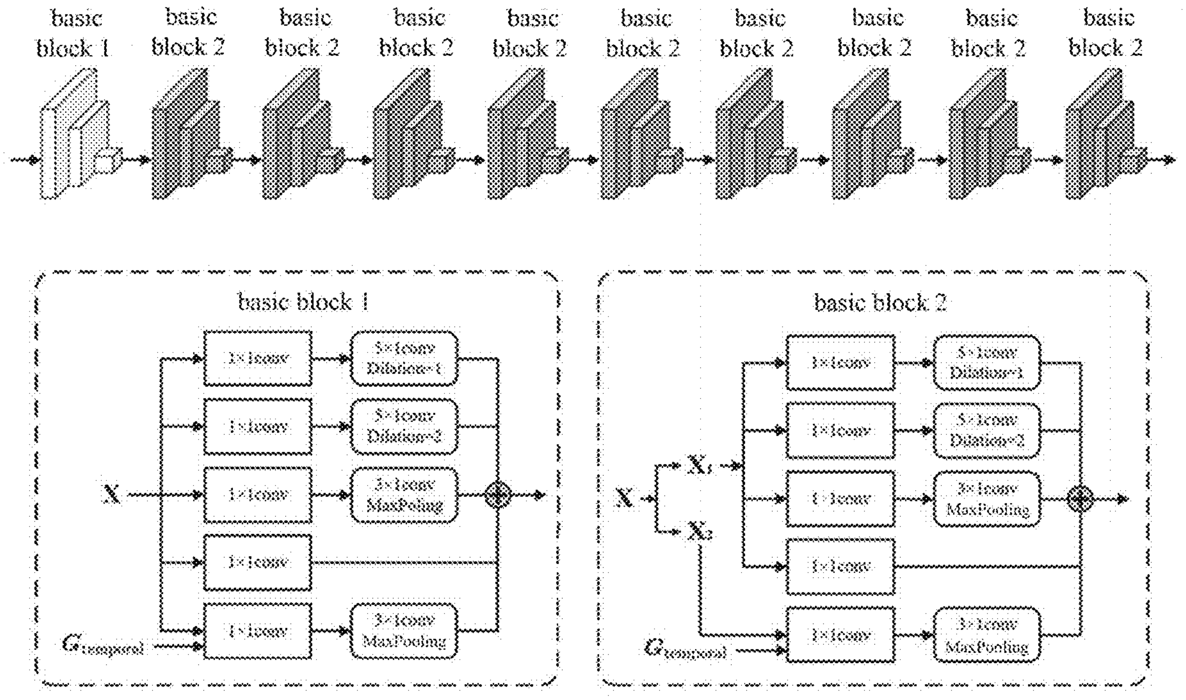
FIG. 7 is a schematic structural diagram of an embodiment of a temporal hypergraph neural network of the multi-view human action recognition method based on hypergraph learning according to the present invention.

As shown in FIG. 7, a temporal hypergraph neural network consists of 10 layers, wherein a first temporal hypergraph basic block is used in the first layer, and a second temporal hypergraph basic block is used in the other layers, so that effective learning and training of time- series feature information can be realized. In order to conduct efficient learning and training and reduce computation in the network, the first temporal hypergraph basic block uses the vertex features X as an input of five branches, and each branch contains a 1×1 convolutional layer to reduce the number of channel dimensions; the first branch and the second branch respectively contain two temporal convolutions with different expansion rates, so as to reduce the number of parameters and extract the feature information of different periods; the third branch and the fifth branch contain a 3×1 max pooling layer respectively, so as to remove redundant information and concatenate results of the five branches to obtain an output. The second temporal hypergraph basic block divides the vertex features X into two parts X1 and X2 equally, X1 is used as an input of the first four branches, X2 is used as an input of the fifth branch, and each branch contains the same network layers as the first temporal hypergraph basic block.

Embodiment 8

In order to verify effectiveness of the multi-view human action recognition method based on hypergraph learning, the following tests are performed in this embodiment.

1. System Deployment And Multi-View Data Acquisition

Figure 8:
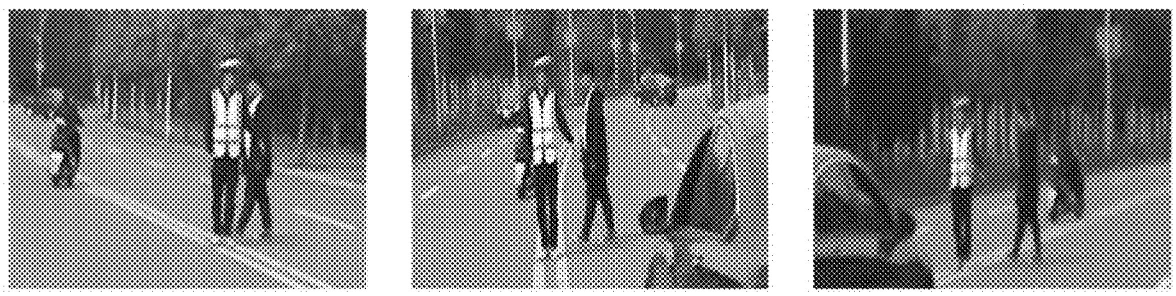
FIG. 8 shows images at a certain moment in different views according to the multi-view human action recognition method based on hypergraph learning of the present invention.
Figure 9:
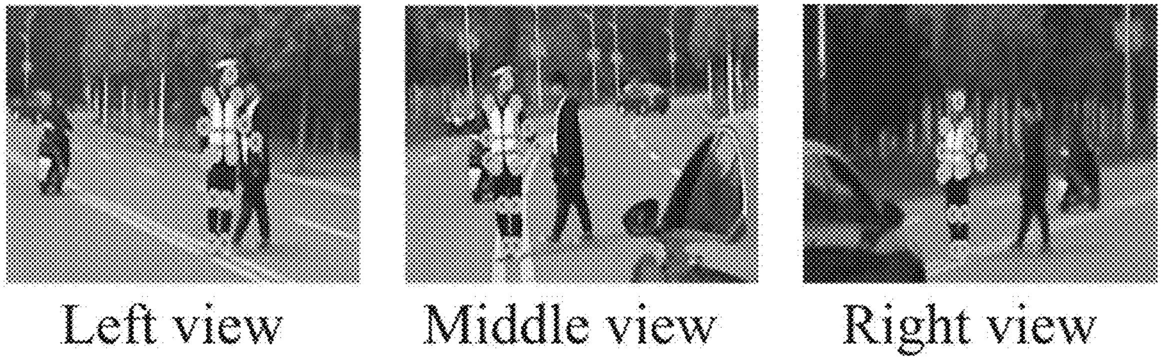
FIG. 9 shows joints of a traffic police in the images at a certain moment in different views according to the multi-view human action recognition method based on hypergraph learning of the present invention.
Figure 10:
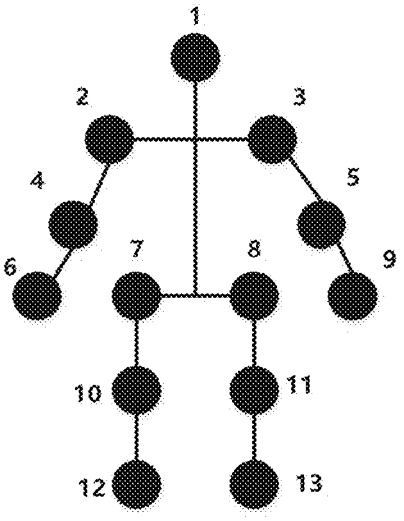
FIG. 10 is a schematic diagram in which numbering of thirteen human body joints are shown according to the multi-view human action recognition method based on hypergraph learning of the present invention.
Figure 11:
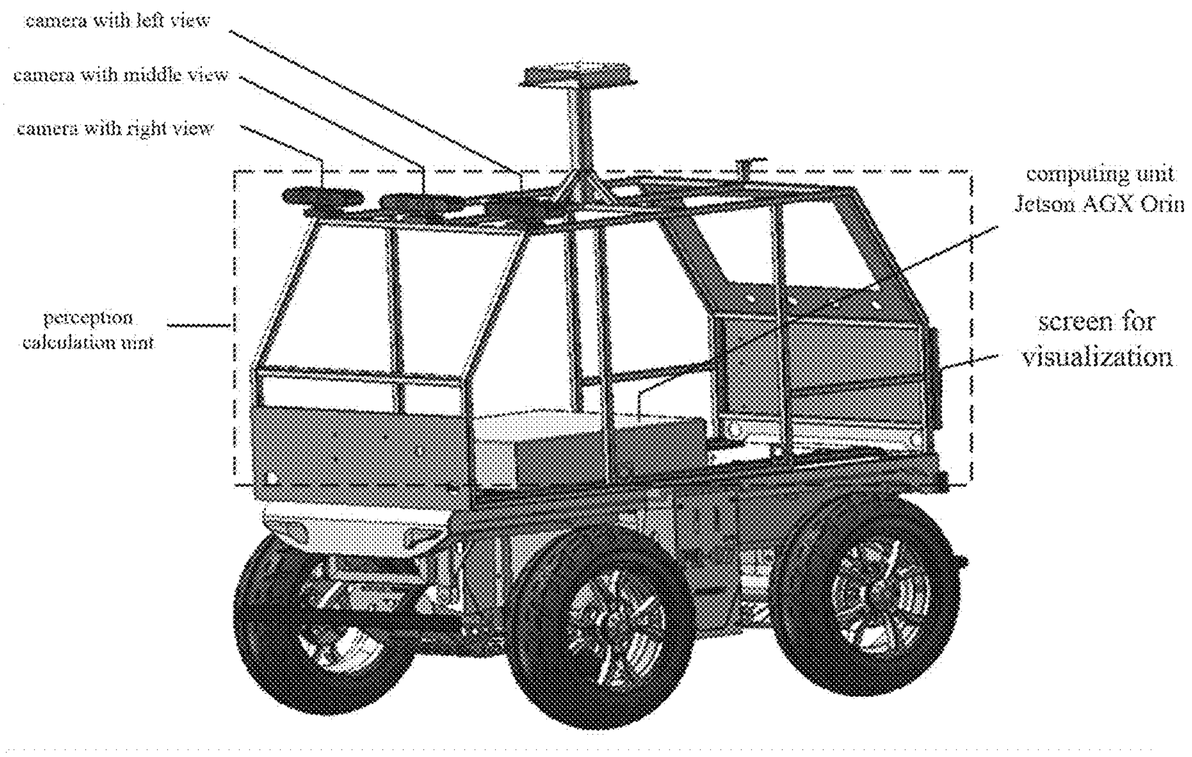
FIG. 11 is a schematic diagram of a deployment structure of a system for executing the multi-view human action recognition method based on hypergraph learning of the present invention on a wheeled robot.

This embodiment provides a multi-view human action recognition system based on hypergraph learning, which is used to perform the multi-view human action recognition method based on hypergraph learning, the system comprises cameras with multiple views, a computing unit (in this embodiment a Jetson AGX Orin is used), and a screen for visualization. In this embodiment, it is preferred that the system is deployed on a wheeled robot as shown in FIG. 11, a front frame of the wheeled robot is mounted with three cameras with a left view, a middle view and a right view respectively, and a relevant computer program is deployed in the computing unit. The cameras with multiple views acquire video data including hand gestures of a traffic policeman; the computing unit pre-processes the video data, constructs hypergraphs, and then recognizes the hand gestures of the traffic policeman and makes corresponding interaction; a recognition result is displayed on the screen for visualization. This setting kind of the cameras can provide multiple views to capture the actions of a target from different directions, thereby solving problems such as the target being obscured. FIG. 8 shows images at a certain moment in three different views obtained by the cameras with the multiple views 2. Procession of Video Information The video data is acquired using cameras with different views, and the multi-view video data is preprocessed. In this embodiment the video data acquired from the left view, the middle view and the right view is an input, the video data is segmented into N frames, and joint information of each frame is extracted using Openpose. In this embodiment, 13 joints are extracted for each person in each frame, and x and y coordinates of the joints are stored as an initial feature matrix X of the joints. FIG. 9 shows the joints extracted for the traffic policeman in the images shown in FIG. 8. A numbering sequence of the human joints is shown in FIG. 10.

3. Hypergraph Construction (1) Construction of Temporal Hypergraph

Temporal hypergraphs are constructed according to a method in the embodiment 4. Specifically, in this embodiment, taking the joints of the traffic policeman shown in FIG. 9 as an example, in different frames in the same view, all joints numbered 1 are connected by a hyperedge; all joints numbered 2, 4 and 6 are connected by a hyperedge; all joints numbered 3, 5 and 9 are connected by a hyperedge; all joints numbered 7, 10 and 12 are connected by a hyperedge; and all joints numbered 8, 11, and 13 are connected by a hyperedge. Since there are three views of left, middle and right, three temporal hypergraphs are constructed.

(2) Construction of Spatial Hypergraph

Spatial hypergraphs are constructed according to a method in the embodiment 3. Specifically, in this embodiment, taking the joints of the traffic policeman shown in FIG. 9 as an example, in the same frame in different views, all joints numbered 1 are connected by a hyperedge; all joints numbered 2, 4 and 6 are connected by a hyperedge; all joints numbered 3, 5 and 9 are connected by a hyperedge; all joints numbered 7, 10 and 12 are connected by a hyperedge; and all joints numbered 8, 11, and 13 are connected by a hyperedge. Since the video data of each view is divided into N frames, N spatial hypergraphs are constructed in total.

4. Hypergraph Learning (1) Construction of spatial hypergraph neural network

In this embodiment, a spatial hypergraph neural network is constructed according to the embodiment 6.

(2) Temporal Hypergraph Neural Network Construction

In this embodiment, a temporal hypergraph neural network is constructed according to the embodiment 7.

5. Training and Testing

A initialized feature matrix, A Laplace matrix, and An autocorrelation matrix are used as inputs of the spatial hypergraph neural network, and $f_{spatial}$ is an output of the spatial hypergraph neural network, denoting the spatial hypergraph features, a initialized feature matrix and a Laplace matrix are used as inputs of the temporal hypergraph neural network, wherein $$G_p^{tem}$$

is inputted to the fifth branch of the temporal hypergraph basic block only, and $f_{temporal}$ is an output of the temporal hypergraph neural network, denoting the temporal hypergraph features. Finally, obtained features are fused and probability values of action prediction are calculated by Softmax, and a final prediction category is the corresponding action category with the largest probability value. 6. Testing results In this embodiment, a self-collected hand gesture dataset of traffic police is used for testing, the dataset includes 8 gestures of traffic police which are stop, go straight, turn left, wait for left turn, turn right, change lane, slow down and pull over in 3 views (left, middle and right) and frame by frame annotated. A total video length of the dataset is approximately 32 hours, with 250,760 original images and 172,800 annotated images, cameras with three views are used to simultaneously shoot in different scenes. For all tests, deep learning is executed on two 2080Ti GPUs, in training, SGD optimization algorithm (momentum is 0.9) is used, weight decay is 0.0004, epoch is 100, and learning rate is 0.05. Compared with single-view action recognition methods, the performance of the multi-view human action recognition method based on hypergraph learning of the present invention is significantly improved, as shown in Table 1. The present invention solves the problem that accuracy of action recognition is low when the target is blocked in a single view.

TABLE 1

Evaluating different networks using self-collected hand gesture dataset of traffic police

| Method | Accuracy | Precision | Recall | F1 |
|---|---|---|---|---|
| HGNN | 73.88% | 79.39% | 74.88% | 73.65% |
| 2S-AGCN | 77.78% | 66.67% | 77.78% | 70.37% |
| MS-G3D | 77.92% | 83.37% | 77.92% | 76.05% |
| CTR-GCN | 95.65% | 95.39% | 95.65% | 95.12% |
| Present Method | 98.18% | 98.20% | 98.16% | 98.16% |

In the Table 1, the method HGNN is disclosed in a paper "Hypergraph neural networks", the method 2s-AGCN is disclosed in a paper "Two-stream adaptive graph sequential networks for skeleton-based action recognition", the method MS-G3D is disclosed in a paper "Disentangling and unifying graph convolutions for skeleton-based action recognition", and the method CTR-GCN is disclosed in a paper "Channel-wise topology refinement graph convolution for skeleton-based action recognition", they are all single-view action recognition methods.

In addition, in order to verify generalization and robustness of the multi-view human action recognition method based on hypergraph learning of the present invention, in this embodiment, a test is performed using a public dataset NTU-RGB+D, and the method of the present invention is compared with other single-view action recognition methods based on graph structure or hypergraph structure, and comparison results are shown in Table 2. It can be found from Table 2 that ability to process multi-view data of the present invention is significantly better than that of other networks, and associations among multi-view data can be established, thereby human action recognition can be performed effectively in more complex environments. In addition, since the hypergraph models higher order correlation existing in human skeleton, the experimental performance of the method of the present invention is better than that of the traditional methods based on graph neural network.

TABLE 2

Comparison of classification accuracy with state-of-the-art methods using the NTU-RGB + D 60 dataset (Cross-View)

| Type | Method | Accuracy (%) |
|---|---|---|
| GCN-based | ST-GCN | 88.3 |
| | 2S-AGCN | 95.1 |
| | MS-AAGCN | 96.2 |
| | Shift-GCN | 96.5 |
| HGNN-based | Hyper-GCN(3S) | 95.7 |
| | Selective-HCN | 96.6 |
| | Present Method | 96.7 |

In the Table 2, the method ST-GCN is disclosed in a paper "Spatial temporal graph continuous networks for skeleton-based action recognition", the method MS-AAGCN is disclosed in a paper "Skeleton based action recognition with multi-stream adaptive graph convolutional networks", the method Shift-GCN is disclosed in a paper "Skeleton-Based Action Recognition With Shift Graph Convolutional Network", the method Hyper-GCN (3S) is disclosed in a paper "Hypergraph neural network for Skeleton-based action recognition", the method Selective-HCN is disclosed in a paper "Selective Hypergraph Convolutional Networks for Skeleton-based Action Recognition", and the rest of the methods are the same with that in the Table 1.

In order to verify the effectiveness of the temporal hypergraph neural network and the spatial hypergraph neural network, in this embodiment, ablation experiments are respectively performed using the self-collected hand gesture dataset of traffic police and the NTU-RGB+D dataset (Cross-View), and the effectiveness of the method proposed in the present invention is respectively compared when using only the temporal hypergraph neural network, only the spatial hypergraph neural network, and both the temporal hypergraph neural network and the spatial hypergraph neural network. The experimental results are shown in Table 3. The experimental results show that, using the two datasets, the accuracy rates of action recognition of using only the spatial hypergraph neural network and using only the temporal hypergraph neural network are obviously lower than that of using both of them simultaneously, so the hypergraph neural network proposed by the present invention has remarkable effect on extracting temporal and spatial correlation.

TABLE 3

Comparisons with different combined networks on NTU-RGB + D dataset (Cross-View) and hand gesture dataset of traffic police

| Method | Accuracy (%) | |
|---|---|---|
| | hand gesture of traffic police | NTU-RGB + D |
| only spatial | 92.3 | 90.2 |
| only temporal | 94.4 | 89.9 |
| Present Method | 98.2 | 91.8 |

In order to better understand the present invention, the detailed description is made above in conjunction with the specific embodiments of the present invention, but it is not a limitation of the present invention. Any simple modification to the above embodiments based on the technical essence of the present invention still belongs to the scope of the technical solution of the present invention. Each embodiment in this specification focuses on differences from other embodiments, and the same or similar parts between the various embodiments can be referred to each other. As for the system embodiment, since it basically corresponds to the method embodiment, the description is relatively simple, and the relevant part can refer to the part of the description of the method embodiment.

The invention claimed is:

1. A multi-view human action recognition method based on hypergraph learning, comprising acquiring video data from P views, wherein the method further comprises the following steps:

step 1: pre-processing the video data, comprising:

segmenting, for each of the P views, the video data into N frames, and extracting joint information of a human body from each frame;

step 2: constructing spatial hypergraphs based on joint information, comprising:

constructing N spatial hypergraphs, each corresponding to one frame of the video data, by using joints of the human body as vertices, dividing the human body into a plurality of body parts including a torso, a left hand, a right hand, a left leg, and a right leg, and for each body part, constructing a hyperedge that connects joints of the body part from different views at a same frame, such that each spatial hypergraph represents spatial correlations of joints across the P views;

step 3: constructing temporal hypergraphs based on the joint information, comprising:

constructing P temporal hypergraphs, each corresponding to one of the P views, by using the joints of the human body as vertices, and for each body part, constructing a hyperedge that connects joints of the body part from different frames within a same view, such that each temporal hypergraph represents temporal correlations of joints across the N frames;

step 4: performing feature learning of the spatial hypergraphs and the temporal hypergraphs using hypergraph neural networks, comprising:

performing feature learning of the spatial hypergraphs using a spatial hypergraph neural network to obtain spatial hypergraph features, and performing feature learning of the temporal hypergraphs using a temporal hypergraph neural network to obtain temporal hypergraph features; and step 5: extracting higher order information represented by the spatial hypergraphs and the temporal hypergraphs, and performing action recognition of human actions, comprising:

fusing the spatial hypergraph features and the temporal hypergraph features to obtain fused features, and performing the action recognition based on the fused features.

2. The multi-view human action recognition method based on hypergraph learning according to claim 1, wherein the pre-processing of the video data further comprises: extracting the joint information of each frame using Openpose, storing the joint information in a json file by saving x and y coordinates of joints, and constructing the spatial hypergraphs and the temporal hypergraphs based on the joint information.

3. The multi-view human action recognition method based on hypergraph learning according to claim 2, wherein the spatial hypergraph is a hypergraph $\mathcal{G}^{spa}=(\mathcal{G}^{spa}, \varepsilon^{spa}, W^{spa})$ that is constructed according to a limb composition strategy by using the joints of the human body as vertices and that is used to achieve an aggregation of spatial information of joints of the human body, wherein $\mathcal{G}^{spa}$ represents a vertex set of the spatial hypergraph, $\varepsilon^{spa}$ represents a hyperedge set of the spatial hypergraph, and $W^{spa}$ represents weight of each hyperedge in the hyperedge set of the spatial hypergraph, which is a weight matrix.

4. The multi-view human action recognition method based on hypergraph learning according to claim 3, wherein the constructing of the spatial hypergraphs comprises the following sub-steps:

step 21: initializing initial vertex features of each spatial hypergraph as a feature matrix $X_n$, each row of the feature matrix being coordinates of the joints of the human body;

step 22: generating an n-th spatial hypergraph $$\mathcal{G}_n^{spa}$$

step 23: constructing an incidence matrix $$H_n^{spa}$$

based on the vertex set and the hyperedge set;

step 24: computing degrees $$d_n^{spa}\left(v_{p,n}^{(i)}\right)$$

of vertices in the n-th spatial hypergraph and degrees $$\delta_n^{spa}\left(e_{m,n}^{spa}\right)$$

of hyperedges in the n-th spatial hypergraph, wherein $$d_n^{spa}$$

represents a function for computing the degrees of the vertices in the n-th spatial hypergraph, $$\delta_n^{spa}$$

represents a function for computing the degrees of the hyperedges in the n-th spatial hypergraph, $$v_{p,n}^{(i)}$$

represents an i-th joint in an n-th frame of a p-th view, and $$e_{m,n}^{spa}$$

represents an m-th hyperedge in the n-th spatial hypergraph; and step 25: optimizing the hypergraph neural networks using higher order information, and generating a Laplace matrix $$G_n^{spa}$$

by performing Laplace transformation of the incidence matrix $$H_n^{spa}.$$

5. The multi-view human action recognition method based on hypergraph learning according to claim 4, wherein a calculation formula of the n-th spatial hypergraph $$\mathcal{G}_n^{spa}$$

is:

$$G_n^{spa} = (v_n^{spa}, \mathcal{E}_n^{spa}, W_n^{spa})$$

wherein $$v_n^{spa}$$

represents a vertex set of the n-th spatial hypergraph, $$\mathcal{E}_n^{spa}$$

represents a hyperedge set of the n-th spatial hypergraph, and $$W_n^{spa}$$

represents a weight of each hyperedge in the n-th spatial hypergraph, n=1, 2, . . . , N.

6. The multi-view human action recognition method based on hypergraph learning according to claim 5, wherein the step 23 comprises that the incidence matrix $$H_n^{spa}$$

of the n-th spatial hypergraph represents topology of the n-th spatial hypergraph, and a corresponding element in the incidence matrix is 1 if a vertex exists in a certain hyperedge, and 0 otherwise.

7. The multi-view human action recognition method based on hypergraph learning according to claim 6, wherein the incidence matrix of each spatial hypergraph is defined as:

$$H_n^{spa}(v_{p,n}^{(i)}, e_{m,n}^{spa}) = \begin{cases} 1, & v_{p,n}^{(i)} \in e_{m,n}^{spa} \\ 0, & v_{p,n}^{(i)} \notin e_{m,n}^{spa} \end{cases}$$

wherein $$v_{p,n}^{(i)}$$

represents the i-th joint in the n-th frame of the p-th view, and $$e_{m,n}^{spa}$$

represents the m-th hyperedge in the n-th spatial hypergraph, wherein m=1, 2, . . . , M, and M is a number of hyperedges in a spatial hypergraph.

8. The multi-view human action recognition method based on hypergraph learning according to claim 7, wherein the step 24 comprises that a calculation formula of the degrees $$d_n^{spa}(v_{p,n}^{(i)})$$

of a vertex $$v_{p,n}^{(i)} \in v_n^{spa}$$

in the n-th spatial hypergraph is:

$$d_n^{spa}(v_{p,n}^{(i)}) = \sum_{e_{m,n}^{spa} \in \mathcal{E}_n^{spa}} w_n^{spa}(e_{m,n}^{spa}) H_n^{spa}(v_{p,n}^{(i)}, e_{m,n}^{spa})$$

wherein $$W_n^{spa}(e_{m,n}^{spa})$$

is a weight vector of the hyperedge $$e_{m,n}^{spa}.$$

9. The multi-view human action recognition method based on hypergraph learning according to claim 8, wherein the step 24 further comprises that a calculation formula of the degrees $$\delta_n^{spa}(e_{m,n}^{spa})$$

of a hyperedge $$e_{m,n}^{spa} \in \mathcal{E}_n^{spa}$$

in the n-th spatial hypergraph is:

$$\delta_n^{spa}(e_{m,n}^{spa}) = \sum_{v_{p,n}^{(i)} \in v_n^{spa}} H_n^{spa}(v_{p,n}^{(i)}, e_{m,n}^{spa}).$$

10. The multi-view human action recognition method based on hypergraph learning according to claim 9, wherein a calculation formula of the Laplace matrix $$G_n^{spa}$$

is:

$$G_n^{spa} = D_{v_n}^{-1/2} H_n^{spa} W_n^{spa} D_{e_n}^{-1} (H_n^{spa})^T D_{v_n}^{-1/2}$$

wherein $$D_{v_n}^{-1/2}$$

represents square root of an inverse matrix of the diagonal matrix of the degrees of the vertices in the n-th spatial hypergraph, and $$D_{e_n}^{-1}$$

represents an inverse matrix of the diagonal matrix of the degrees of the hyperedges in the wherein $D_{e_n}$ and $D_{v_n}$ represent diagonal matrices of the degrees of the hyperedges and the degrees of the vertices in the n-th spatial hypergraph respectively.

* * * * *